(12) United States Patent
Zhu

(10) Patent No.: US 10,884,165 B2
(45) Date of Patent: Jan. 5, 2021

(54) DISPLAY DEVICE WITH PROTECTIVE ANTI-GLARE LAYERS AND METHOD FOR MANUFACTURING THE SAME

(71) Applicants: BOE Technology Group Co., Ltd., Beijing (CN); Beijing BOE Special Display Technology Co., Ltd., Beijing (CN)

(72) Inventor: Huizhong Zhu, Beijing (CN)

(73) Assignees: BOE TECHNOLOGY GROUP CO., LTD., Beijing (CN); BEIJING BOE SPECIAL DISPLAY TECHNOLOGY CO., LTD., Beijing (CN)

( * ) Notice: Subject to any disclaimer, the term of this patent is extended or adjusted under 35 U.S.C. 154(b) by 141 days.

(21) Appl. No.: 16/190,887

(22) Filed: Nov. 14, 2018

(65) Prior Publication Data
US 2019/0302328 A1     Oct. 3, 2019

(30) Foreign Application Priority Data

Mar. 28, 2018  (CN) .......................... 2018 1 0265143

(51) Int. Cl.
*G02B 27/00*    (2006.01)
*G02B 5/02*     (2006.01)
(Continued)

(52) U.S. Cl.
CPC ......... *G02B 5/0242* (2013.01); *G02B 5/0268* (2013.01); *G02B 5/0278* (2013.01); *G02B 5/3025* (2013.01); *G02F 1/133504* (2013.01)

(58) Field of Classification Search
CPC ... G02B 1/00; G02B 1/10; G02B 1/14; G02B 5/02; G02B 5/0205; G02B 5/021; G02B 5/0215; G02B 5/0221; G02B 5/0226; G02B 5/0231; G02B 5/0236; G02B 5/0242; G02B 5/0257; G02B 5/0268; G02B 5/0273; G02B 5/02785; G02B 5/0294; G02B 6/0001;
(Continued)

(56) References Cited

U.S. PATENT DOCUMENTS 7,898,636 B2 * 3/2011 Inoue .................... C04B 35/597
                                                      313/505
2011/0279752 A1* 11/2011 Yamahara ............ G02B 5/0278
                                                      349/64

FOREIGN PATENT DOCUMENTS

CN        101267940 A      9/2008
CN        102265193 A     11/2011
(Continued)

OTHER PUBLICATIONS

Office Action dated Jul. 6, 2020 for application No. CN201810265143.3 with English translation attached.

*Primary Examiner* — Arnel C Lavarias
(74) *Attorney, Agent, or Firm* — Nath, Goldberg & Meyer; Joshua B. Goldberg

(57) ABSTRACT

A display device and a method for manufacturing the same. The display device includes a display panel, a first anti-glare layer and a second anti-glare layer, the first anti-glare layer being located on a light-emitting side of the display panel, and the second anti-glare layer being located on a side of the first anti-glare layer away from the display panel. In the display device, by providing two kinds of anti-glare layers, the sparkling phenomenon of the display device is improved, thereby improving the anti-glare effect of the display device.

9 Claims, 2 Drawing Sheets

(51) Int. Cl.
*G02B 5/30* (2006.01)
*G02F 1/1335* (2006.01)

(58) Field of Classification Search
CPC .. G02B 6/0011; G02B 6/0013; G02B 6/0015;
G02B 6/0023; G02B 6/0025; G02B
6/0033; G02B 6/0035; G02B 6/0036;
G02B 6/004; G02B 6/0041; G02B
6/0043; G02B 6/005; G02B 6/0051;
G02B 6/0053; G02B 6/0065
USPC ........ 359/599, 601, 609; 362/600, 602, 606,
362/607, 608, 615, 617, 618, 619, 620,
362/621, 622, 627, 628, 629
See application file for complete search history.

(56) References Cited

FOREIGN PATENT DOCUMENTS

| | | | |
|---|---|---|---|
| JP | 2007101679 | A | 4/2007 |
| JP | 2007249191 | A | 9/2007 |
| JP | 2007322779 | A | 12/2007 |

\* cited by examiner

DISPLAY DEVICE WITH PROTECTIVE ANTI-GLARE LAYERS AND METHOD FOR MANUFACTURING THE SAME

CROSS-REFERENCE OF RELATED APPLICATIONS

The present application claims the priority of Chinese Patent Application No. 201810265143.3 filed on Mar. 28, 2018 in accordance with the Paris Treaty, the entire contents of which are hereby incorporated by reference.

FIELD

The present disclosure relates to a field of display technology, and specifically relates to a display device and a method for manufacturing the same.

BACKGROUND

In display devices having a high resolution, an anti-glare film sheet is generally added to a display panel so as to perform an anti-glare treatment to the display panel, thereby eliminating shadows and reduce reflected lights.

SUMMARY

The present disclosure provides a display device and a method for manufacturing the same.

One aspect of the present disclosure provides a display device, comprising a display panel, a first anti-glare layer and a second anti-glare layer, the first anti-glare layer being located on a light-emitting side of the display panel, and the second anti-glare layer being located on a side of the first anti-glare layer away from the display panel.

Optionally, the first anti-glare layer comprises a protective material layer and anti-glare particles in the protective material layer.

Optionally, the material of the anti-glare particles is acrylics.

Optionally, the color of the acrylics is white.

Optionally, the anti-glare particles have a diameter in a range of 0.1 µm to 0.5 µm.

Optionally, the sum of the volume of the anti-glare particles accounts for a volume ratio in a range of 20% to 30% based on the volume of the protective material layer.

Optionally, the display device further includes a polarizer between the first anti-glare layer and the second anti-glare layer.

Optionally, a portion of the anti-glare particles in the first anti-glare layer protrude from a side of the protective material layer facing the polarizer.

Optionally, the material of the second anti-glare layer is acrylics.

Another aspect of the present disclosure provides a method for manufacturing a display device, including:

forming a first anti-glare layer on a light-emitting side of a display panel; and forming a second anti-glare layer on a side of the first anti-glare layer away from the display panel.

Optionally, forming a first anti-glare layer on a light-emitting side of a display panel includes:

preparing a first anti-glare composition comprising a mixture of a protective material and anti-glare particles; and coating the first anti-glare composition on the light-emitting side of the display panel to form the first anti-glare layer on the light-emitting side of the display panel, the first anti-glare layer comprising a protective material layer and the anti-glare particles in the protective layer.

DETAILED DESCRIPTION OF EMBODIMENTS

In order to enable a person skilled in the art to better understand the technical solutions of the present disclosure, the display device and the manufacturing method thereof according to the present disclosure are described in detail below with reference to the accompanying drawings.

Figure 1:
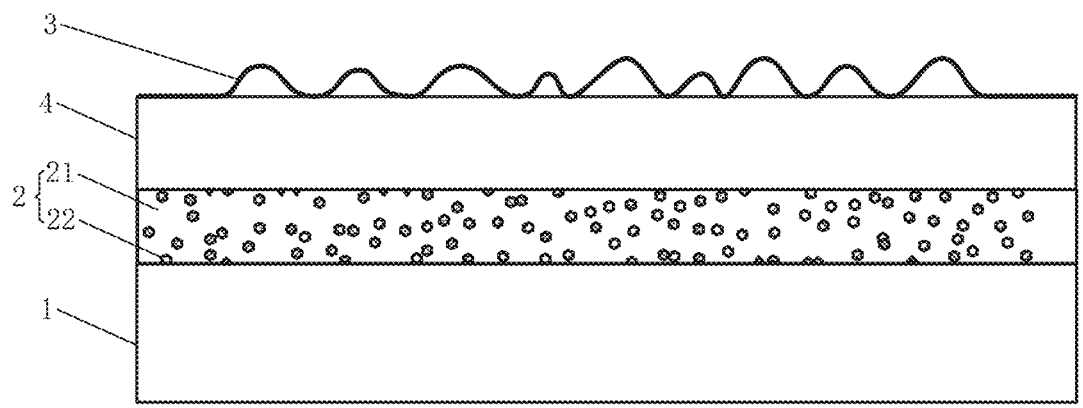
FIG. 1 is a structure diagram of a display device according to an embodiment of the present disclosure.

FIG. 1 is a structure diagram of a display device according to an embodiment of the present disclosure. As shown in FIG. 1, the display device includes a display panel 1, a first anti-glare layer 2 and a second anti-glare layer 3, wherein the first anti-glare layer 2 is located on a light-emitting side of the display panel 1 and the second anti-glare layer 3 is located on a side of the first anti-glare layer 2 away from the display panel 1.

In the present embodiment, the first anti-glare layer 2 includes a protective material layer 21 and anti-glare particles 22 in the protective material layer 21. The first anti-glare layer 2 may have a thickness of 2 µm to 3 µm.

The material of protective material layer 21 may be a resin adhesive-based material, such as fluoride resin. The protective material layer 21 functions as a substrate for the anti-glare particles.

The material of the anti-glare particles 22 may be acrylics. Acrylics include acrylates, especially polymethyl methacrylate (PMMA). The color of acrylics is white, which can block a part of the light from directly penetrating the second anti-glare layer 3. In the present embodiment, the anti-glare particles 22 employ white acrylics.

In the present embodiment, the diameter of the anti-glare particles 22 may be set according to the actual number of pixels (Pixels per Inch, simply referred to as PPI). The higher the PPI is, the smaller the unit pixel area and the selected anti-glare particles are. The diameter of the anti-glare particles 22 may be in a range of 0.1 µm to 0.5 µm. In one embodiment, the diameter is in a range of 0.1 µm to 0.3 µm. In another embodiment, the diameter is in a range of 0.2 µm to 0.3 µm, so as to better block light from directly penetrating the second anti-glare layer 3.

The volume of the anti-glare particles 22 may account for a volume ratio in a range of 20% to 30% based on the volume of the protective material layer 21, thereby ensuring both an anti-glare effect and a higher light transmittance.

In the present embodiment, the material of the second anti-glare layer 3 may be selected from acrylics, and the thickness thereof may be 1 µm to 2 µm.

In the present embodiment, the display device may further include a first polarizer located on the light-incident side of the display panel 1, a second polarizer 4 located on the light-emitting side of the display panel 1. The second polarizer 4 is located between the first anti-glare layer 2 and the second anti-glare layer 3. As shown in FIG. 1, the first anti-glare layer 2 is located on the display panel 1, the second polarizer 4 is located on the first anti-glare layer 2, and the second anti-glare layer 3 is located on the second polarizer 4. The first polarizer is located below the display panel 1, and is not specifically drawn in FIG. 1. In the present embodiment, the second polarizer 4 is provided with a pressure sensitive adhesive on a side facing the first anti-glare layer 2. The pressure sensitive adhesive is used to bond the second polarizer 4 to the first anti-glare layer 2. A portion of the anti-glare particles 22 in the first anti-glare layer 2 protrude from a side of the protective material layer facing the second polarizer 4. The protruding anti-glare particles 22 are in contact with the pressure sensitive adhesive of the second polarizer 4, increasing the bonding area between the pressure sensitive adhesive on the second polarizer 4 and the first anti-glare layer 2, thereby improving the adhesion force of the second polarizer 4 and reducing the risk of polarizer peeling due to reliability testing.

Figure 2:
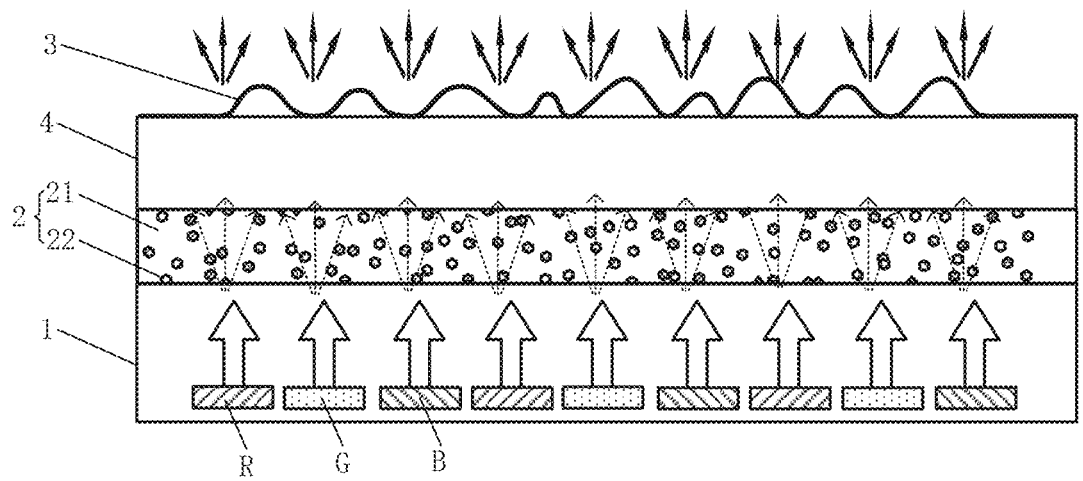
FIG. 2 is a diagram showing the anti-glare mechanism of the display device in FIG. 1.

FIG. 2 is a diagram showing the anti-glare mechanism of the display device in FIG. 1. As shown in FIG. 2, in the present embodiment, the display panel 1 is a liquid crystal display panel. The display panel 1 includes a color filter substrate and an array substrate disposed opposite to each other, and a liquid crystal layer provided between the color filter substrate and the array substrate; wherein the color filter substrate includes a plurality of color resists, and the color resists may include red color resist R, green color resist G, or blue color resist B, wherein the red color resist R, the green color resist G, and the blue color resist B are sequentially arranged. It should be noted that the display panel 1 in FIG. 2 only shows a plurality of color resists, and the remaining structures are not specifically drawn. The light emitted by the backlight module passes through the color resists and is irradiated to the first anti-glare layer 2. Since the anti-glare particles 22 provided in the first anti-glare layer 2 can block a part of the light from directly penetrating the first anti-glare layer 2, the polarizer 4 and the second anti-glare layer 3, so that the light is scattered to the second the anti-glare layer 3, thereby improving the sparkling phenomenon and enhancing the anti-glare effect of the display device.

Figure 3:
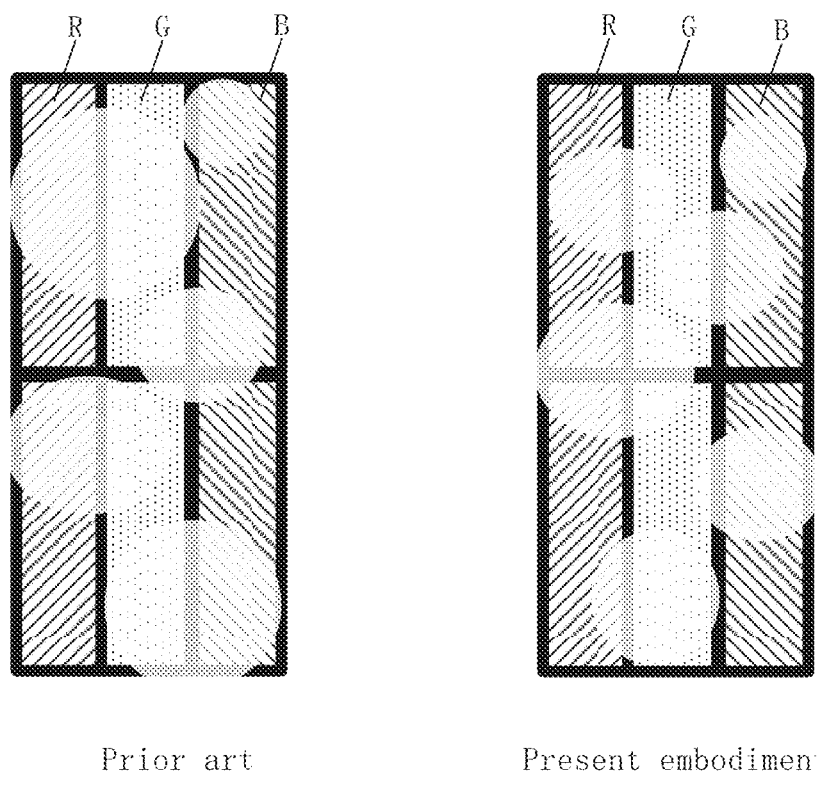
FIG. 3 is a diagram showing anti-glare effects of the display devices according to the present embodiment and the related art.

FIG. 3 is a diagram showing anti-glare effects of the display devices according to the present embodiment and the related art. As shown in FIG. 3, the circular structure above the color resists is used to indicate the glare of the display device. The larger the size of the circular structure is, the stronger the glare of the display device is. It can be seen from FIG. 3 that the size of the circular structure in the related art is large, so the glare of the display device is strong, while the size of the circular structure in the present embodiment is small, so the glare of the display device is weak. In summary, the glare of the display device in the present embodiment is weaker than that in the related art, thereby improving the sparkling phenomenon. It can be seen from FIG. 3 that, in the present embodiment, by adding the first anti-glare layer 2, the intensity and range of the light transmitting the display device are controlled, thereby greatly improving the sparkling phenomenon of display devices having a high resolution.

In display devices having a high resolution, as described above, generally, an anti-glare film sheet is added to a display panel to perform an anti-glare treatment to the display panel. However, as the resolution of display devices increases, the number of pixels (PPI) is also getting higher. In the related art, the technical solution of adding an anti-glare film sheet to a display panel causes light to directly penetrate the anti-glare film sheet, thereby causing a sparkling phenomenon in display devices and reducing the anti-glare effects of display devices.

In the technical solution of the display device according to the present embodiment, the first anti-glare layer is located on the light-emitting side of the display panel, and the second anti-glare layer is located on the side of the first anti-glare layer away from the display panel. In the display device of the present embodiment, by providing such two anti-glare layers, the sparkling phenomenon of the display device is improved, thereby improving the anti-glare effect of the display device.

Figure 4:
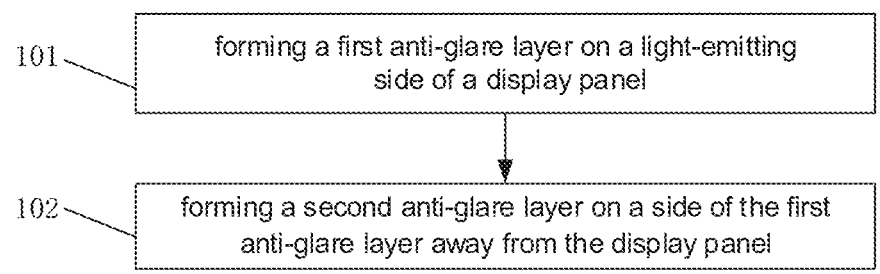
FIG. 4 is a flowchart of a method for manufacturing a display device according to another embodiment of the present disclosure.

FIG. 4 is a flowchart of a method for manufacturing a display device according to another embodiment of the present disclosure.

As shown in FIG. 4, the method includes:

forming a first anti-glare layer on a light-emitting side of a display panel; and forming a second anti-glare layer on a side of the first anti-glare layer away from the display panel, In the present embodiment, the step of forming a first anti-glare layer on a light-emitting side of a display panel includes:

preparing a first anti-glare composition comprising a mixture of a protective material and anti-glare particles; and coating the first anti-glare composition on the light-emitting side of the display panel to form the first anti-glare layer on the light-emitting side of the display panel, wherein the first anti-glare layer comprises a protective material layer and anti-glare particles in the protective material layer, The first anti-glare composition may further comprise photo-curable particles for curing, Coating methods include spraying, printing, and the like, The method for manufacturing the display device according to the present embodiment can be used to manufacture the display device according to the above embodiment, and details are not described herein again.

In the technical solution of the method for manufacturing the display device according to the present embodiment, the first anti-glare layer is located on the light-emitting side of the display panel, and the second anti-glare layer is located on the side of the first anti-glare layer away from the display panel. In the display device according to the present embodiment, by providing such two anti-glare layers, the sparkling phenomenon of the display device is improved, thereby improving the anti-glare effect of the display device, It may be understood that the aforementioned embodiments are merely exemplary embodiments used for illustrating the principle of the present disclosure, and the present disclosure is not limited thereto For a person skilled in the art, various variations and improvements may be made without departing from the spirit and essence of the present disclosure, and those variations and improvements are also encompassed within the protection scope of the present disclosure.

The invention claimed is:

1. A display device comprising a display panel, a first anti-glare layer located on a light-emitting side of the display panel, and a second anti-glare layer located on a side of the first anti-glare layer away from the display panel,
   wherein the first anti-glare layer comprises a protective material layer and anti-glare particles in the protective material layer, and
   the display device further comprises a polarizer between the first anti-glare layer and the second anti-glare layer.

2. The display device according to claim 1, wherein a material of the anti-glare particles is acrylics.

3. The display device according to claim 2, wherein the acrylics is white.

4. The display device according to claim 1, wherein the anti-glare particles have a diameter in a range of 0.1 μm to 0.5 μm.

5. The display device according to claim 1, wherein a sum of a volume of the anti-glare particles accounts for a volume ratio in a range of 20% to 30% based on a volume of the protective material layer.

6. The display device according to claim 1, wherein a portion of the anti-glare particles in the first anti-glare layer protrude from a side of the protective material layer facing the polarizer.

7. The display device according to claim 1, the material of the second anti-glare layer is acrylics.

8. A method for manufacturing a display device, including:
   forming a first anti-glare layer on a light-emitting side of a display panel; and
   forming a second anti-glare layer on a side of the first anti-glare layer away from the display panel,
   wherein the first anti-glare layer comprises a protective material layer and anti-glare particles in the protective material layer, and
   the display device further comprises a polarizer between the first anti-glare layer and the second anti-glare layer.

9. The method for manufacturing a display device according to claim 8, wherein forming a first anti-glare layer on a light-emitting side of a display panel includes:
   preparing a first anti-glare composition comprising a mixture of a protective material and the anti-glare particles; and
   coating the first anti-glare composition on the light-emitting side of the display panel to form the first anti-glare layer on the light-emitting side of the display panel.

* * * * *